Figure 1:
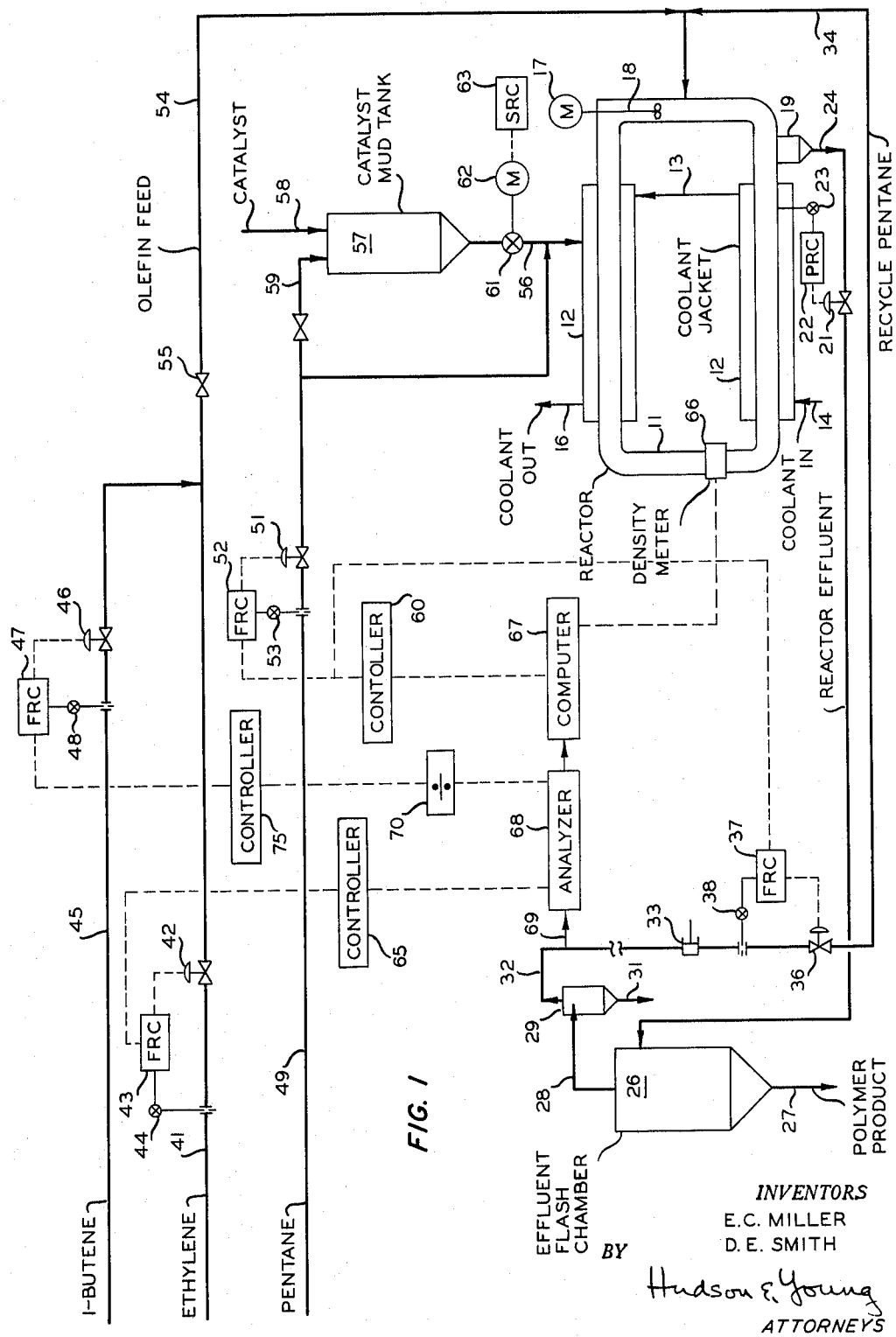

INVENTORS
E.C. MILLER
D. E. SMITH
BY
Hudson E. Young
ATTORNEYS

United States Patent Office 3,257,363
Patented June 21, 1966

3,257,363
CONTROL OF THE COMPOSITION OF A
REACTION MIXTURE
Elmer C. Miller and Dexter E. Smith, both of Bartlesville, Okla., assignors to Phillips Petroleum Company, a corporation of Delaware
Filed May 22, 1961, Ser. No. 126,367
6 Claims. (Cl. 260—88.2)

This invention relates to the control of the composition of a reaction mixture. In one aspect, it relates to a method and apparatus for controlling the composition of a reaction mixture in a chemical process, whereby the efficiency of the reaction is increased and uniform and desirable properties of the reaction product are obtained. In a further aspect, it relates to a method and apparatus for controlling the composition of a polymerization reaction mixture, comprising ethylene, 1-butene, liquid diluent, catalyst, and a particle form polymer of ethylene, wherein the concentration of said polymer in the reaction mixture and the properties of the polymer are controlled.

There is a continuing effort in the chemical and allied industries to exercise more effective and accurate control of various processes. Some of this effort has been directed toward control of the composition of the reaction mixture itself in order to ensure the proper residence time of the reaction mixture, the effective circulation of the reaction mixture, and the quality or specification of the resulting product. The means of control exercised heretofore over these variables have been found wanting in that they entail periodic withdrawal and analysis of reaction mixture samples and the manual resetting of flow rates of various reaction feed streams, such control of the composition of the rection mixture generally relying on empirical considerations requiring long study of and experience with the reaction system. As such, these conventional means of control do not lend themselves to efficient feedback control over the composition of the reaction mixture and the quality or specification of the resulting product.

Figure 2:
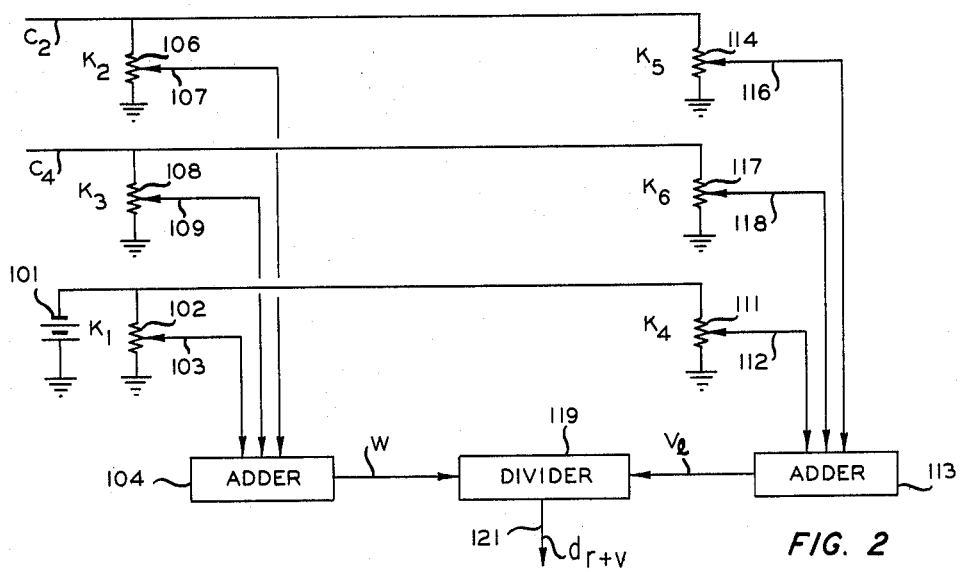
Figure 3:
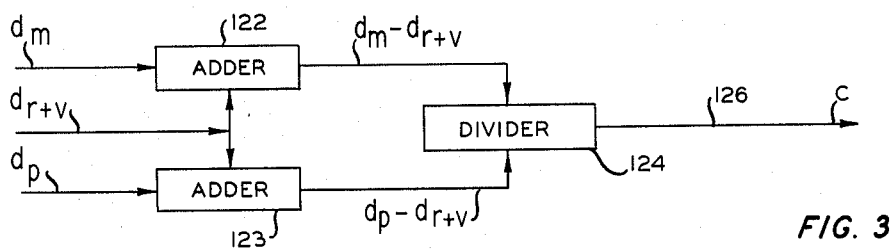
Figure 4:
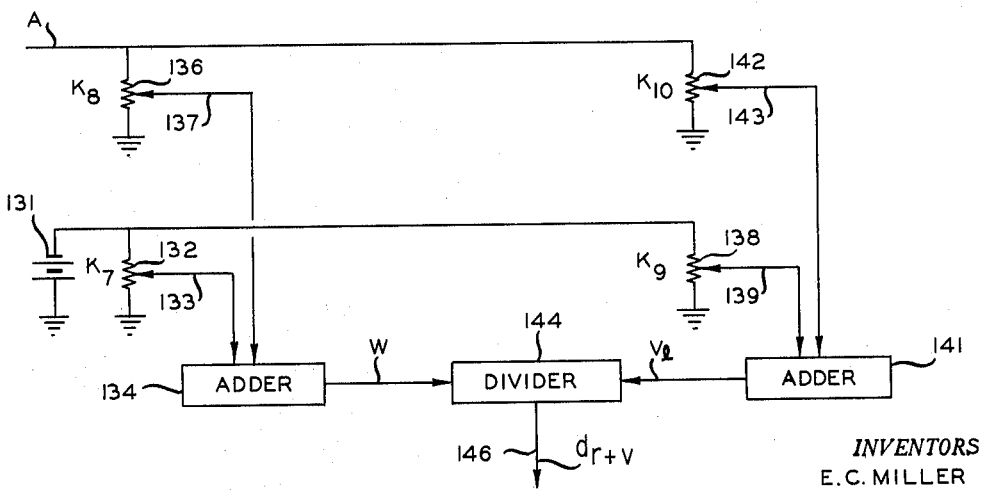

Accordingly, it is an object of this invention to provide an improved mode of control over the composition of a reaction mixture. Another object is to provide a method and apparatus wherein such control results in an increased overall efficiency of reaction and the production of a product of uniform and desirable quality or specification. Another object is to provide an improved method and apparatus for automatically and substantially continuously determining the composition characteristic of a reaction mixture, and accordingly controlling one or more reaction feed streams, whereby more efficient, reliable, and quicker control is exercised over the concentration of product in the reaction mixture and the quality and specification of the resulting product. In a further object, the subject invention provides an improved method and apparatus for controlling the composition of a catalytic polymerization reaction mixture comprising ethylene, 1-butene, liquid diluent, catalyst, and particle form polymer product, wherein the concentration of said polymer product in the reaction mixture is automatically computed and controlled by regulating the amount of diluent used in the reaction system so as to maintain the proper residence time of the polymer in the reaction zone and thereby insure a polymer product having a low ash content; and wherein the amount of olefin reactants in the reaction zone is automatically computed and controlled by regulating the amounts of ethylene and 1-butene used in said reaction system so as to insure a polymer product having desirable and uniform properties or specification. Further objects and advantages of this invention will become apparent to those skilled in the art from the following discussion, appended claims, and accompanying drawing wherein:

FIGURE 1 is a schematic flow diagram of a typical reaction process controlled according to this invention, namely the catalytic polymerization of ethylene to produce particle form polymer, with the novel features of this invention associated therewith; and FIGURES 2, 3, and 4 are schematic circuit diagrams of elements or components which can be used in the control system of this system.

The subject invention is broadly applicable in the control of any continuous reaction process carried out in the liquid or semi-liquid phase wherein one or more reactants and diluent or vehicle are fed to a reaction zone to produce a product having a density different than that of the combined reactants and diluent, particularly those processes which are catalytic in nature and yield solid, semi-solid, or particle form product insoluble in the reaction mixture. For purposes of describing this invention, reference will be made to the catalytic polymerization of ethylene and 1-butene in the presence of a liquid hydrocarbon diluent, such as n-pentane, to produce a solid or particle form polymer of ethylene which is insoluble in the diluent; but it should be understood that this invention is not to be limited unduly to this illustrative process.

Turning now to FIGURE 1, a reactor 11 is diagrammatically shown, this particular reactor being of the closed tubular form, sometimes called in the art a loop reactor, which provides a continuous path for the circulation of the reaction mixture. Such a reactor can be made oblong in shape from straight pipe sections and L's which are joined together to provide a continuous flow path which is substantially free from obstructions. Reactor 11 is jacketed by sections 12 which are connected by line 13, heat exchange medium (e.g., water) for cooling being supplied to the jacket via line 14 and removed via line 16, the spent coolant being passed via line 16 to suitable equipment for condensing coolant vapors and recycling condensed coolant to line 14. The reactor can be provided with other or additional heat exchange means for controlling the reaction temperature. The reactor 11 is also provided with suitable agitation or propelling means, such as a motor 17 which drives a stirrer 18. In this type of reactor, the reaction mixture is propelled through the reaction zone at a velocity in the highly turbulent flow range, e.g., 21 ft./sec. The effluent from the reactor 11 is withdrawn through a product conduit 19, which can be a drain or vertical leg, the withdrawal of effluent being regulated by suitable means, such as flow rate control valve 21, pressure regulator controller 22, and pressure sensing and transmitting means 23, such withdrawal being dependent upon the reactor pressure. Withdrawal of product can be continuous or intermittent. In the case of continuous withdrawal, changes in volumetric reactor input causes changes in valve opening in the product conduit to maintain constant reactor pressure. In the case of intermittent withdrawal, changes in volumetric reactor input causes changes in the time interval between valve openings to maintain constant reactor pressure. Some of the reactant, vehicle, and catalyst is withdrawn along with product. The reactor effluent is passed via line 24 to a suitable product separation means, such as flash chamber 26 where polymer product is separated from the reaction effluent and passed via line 27 to suitable finishing equipment, such as driers, etc. The vaporized components of the reaction mixture comprising unreacted reactant and diluent are withdrawn via line 28 from flash tank 26 and passed to a suitable cyclone chamber 29 to ensure removal of polymer fines, which are withdrawn via line 31. The polymer-free vapors are then passed via line 32 to suitable separation equipment (indicated by the break in line 32) to separate reactant from the diluent, which is compressed by compressor 33 and recycled back to the reaction system via line 34 with the olefin feed. Recycle line 34 can be provided with the usual flow control equipment, such as flow rate control valve 36, flow rate controller 37, and differential pressure transmitter 38.

In the particular process shown in the drawing, the feed streams comprise 1-olefin comonomers, namely ethylene and 1-butene, liquid diluent or vehicle, namely pentane, and catalyst, namely a chromium oxide-silica alumina catalyst. For example, ethylene is supplied via line 41, this line having flow control means therein such as the flow rate control valve 42, flow rate controller 43, and differential pressure transmitter 44. 1-butene is supplied via line 45, the flow rate of this monomer being regulated by suitable flow control means such as flow rate control valve 46, flow rate controller 47, and differential pressure transmitter 48. Pentane diluent is supplied to the reactor 11 via line 49, the latter having associated therewith suitable flow control means such as flow rate control valve 51, flow rate controller 52, and differential pressure transmitter 53. The 1-butene and ethylene streams can be combined and passed by a common olefin feed stream 54 to the reactor 11. The mixture of olefin reactants in line 54 is reduced in pressure to a substantially constant pressure, e.g., 500 p.s.i.g., by means of pressure reducing valve 55. Catalyst for the reaction can be passed to the reactor 11 along with pentane diluent via line 56 from a catalyst mud tank 57 to which catalyst is supplied via line 58 together with some vehicle supplied by line 59, the catalyst flow rate being regulated by suitable flow control means such as a suitable rotary valve 61 driven by a motor 62 which is controlled by speed rate controller 63. The catalyst injection rate can be controlled by means of a heat balance computer or other means to maintain a constant rate of polymer production.

The concentration of polymer product in the reactor will tend to vary due to various process aberrations, such as decline in catalyst activity, the presence of catalyst poisons, etc., and the specification of the polymer product will be dependent upon, among other things, the rate of olefin reactant.

Thus far, there has been described a conventional polymerization process, which by itself does not constitute the subject invention. Further information and details of this particular polymerization process can be found in U.S. Patent 2,825,721 of Hogan et al., which patent describes the production of unique polymers and copolymers by contacting one or more olefins with catalyst comprising as an essential ingredient chromium oxide, preferably including a substantial amount of hexavalent chromium. A more detailed description of the polymerization process for the production of particle form polymer of ethylene can be found in copending application of Leatherman et al., Serial No. 590,567, filed June 11, 1956, now abandoned. In said copending application the production of particle form polymer is described as prepared from ethylene and from mixtures of ethylene with other unsaturated hydrocarbons, for example, mixtures of ethylene with minor amounts of higher 1-olefins having up to 8 carbon atoms per molecule, such as propylene, 1-butene, 1-pentane, 1-hexane, and the like. Examples of comonomers which can be used with ethylene include 1-olefins having no branching nearer the double bond than the 4-position and conjugated and non-conjugated diolefins. The polymerization reaction is carried out in the presence of a liquid hydrocarbon diluent which in inert in the polymerization reaction and in which the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cylclohexane, cyclopentane and methylcyclopentane, methylcyclohexane, etc. The polymerization reaction temperature will vary depending on the particular liquid diluent which is employed and on the olefin reactants. Usually, however, polymerization is carried out at 230° F. and below, preferably between about 150° F and 225° F. The olefin reactants are contacted in the polymerization zone with a suspension of subdivided chromium oxide catalyst in the liquid hydrocarbon diluent under the aforementioned temperatures and under pressures suitable to maintain the diluent in the liquid phase. Concentration of the catalyst in the reaction zone can vary widely; however, generally it will be in the range of 0.001 to 5 percent by weight based on the liquid hydrocarbon diluent.

The novel means for computing and controlling the composition of a reaction mixture according to this invention will now be described.

We have discovered that the concentration of the product in the reaction mixture can be determined and maintained at a desired level by making certain measurements and producing signals proportional thereto, and combining such signals according to the equation $$C = \frac{d_m - d_{r+v}}{d_p - d_{r+v}} \times 100 \qquad (1)$$

where $C$ = concentration of product in reaction mixture
$d_m$ = density of reaction mixture
$d_{r+v}$ = density of combined reactant and vehicle in reaction mixture
$d_p$ = density of product in reaction mixture We have also discovered that in conjunction with maintaining the product concentration at a desired level, that we can maintain product quality by maintaining said $d_{r+v}$ at a desired value.

The above equation is broadly applicable to a continuous process wherein a reaction is carried out in the liquid or semi-liquid phase (e.g., slurry) in a reaction zone to produce a reaction mixture comprising at least one reactant, a vehicle (which itself can be one of the reactants), and a reaction product, the latter reaction mixture component having a density different than the combined density of the non-product or other components (i.e., reactant(s) and vehicle) in the reaction mixture. For example, the reaction mixture can comprise a single reactant, a vehicle, and product, as in the case of the solution polymerization of butadiene in toluene to produce polybutadiene, or as in the case of the solution polymerization of ethylene in cyclohexane to produce polyethylene, or as in the case of the particle form polymerization of ethylene in pentane to produce polyethylene. Said equation can also be applied in determining the concentration of product in a continuous process wherein two reactants are reacted in a vehicle to produce a product, as in the case of the solution or particle form polymerization of ethylene and 1-butene in a cyclohexane or pentane vehicle, respectively, to produce ethylene-1-butene copolymers. Similarly, the equation can be applied in the case wherein three or more reactants are reacted in a vehicle (wherein one of said reactants can also serve as the vehicle), as in the case of the solution or particle form polymerization to produce terpolymers, etc.

In this specification and the appended claims, the term "liquid phase" is used in its broadest sense to cover reaction systems wherein all of the reaction mixture components (usually exclusive, but not necessarily exclusive, of catalyst component) are liquids under the conditions of reaction, or wherein one or more of the components are gases dissolved in the reaction mixture, or wherein the product itself is insoluble in the reaction mixture such as to characterize the latter as a semi-liquid or slurry.

Returning now to FIGURE 1, the control system used according to this invention includes means 66 for continuously measuring the density of the reaction mixture, and producing a signal proportional thereto. Suitable means for this purpose is the Density Measuring System, Model DH-2 of the Industrial Nucleonics Corp., or an Ohmart Density Gauge described in "Industrial Application of Ohmart Cells" by P. E. Ohmart and H. L. Cook, Jr. The output signal, $d_m$ in Equation 1, from such a density measuring device is transmitted to a computer 67, which is designed to compute Equation 1 and produce an output signal proportional to the concentration, C in Equation 1, of polymer in the reaction mixture.

For purposes of determining the density, $d_{r+v}$ in Equation 1, of the liquid phase in the reaction mixture, we prefer to employ analyzer means 68 to determine the amounts of ethylene, and 1-butene reactants in the reaction mixture and produce signals proportional thereto. Such an analyzer can be supplied with a continuous sample stream 69 from the polymer-free off-gas line 32, or with a sample stream from anywhere in the reaction system. We prefer to use for this purpose a gas chromatographic analyzer, such as a Perkin-Elmer Vapor Fractometer, Model 284. The compositional information from analyzer 68 is transmitted by signals to computer 67 and used in solving Equation 1.

As mentioned hereinbefore, due to aberrations in the process, such as decline in catalyst activity, etc., the concentration of polymer in the reaction zone will tend to vary. We propose to maintain the concentration of polymer within a predetermined constant range, e.g., 17.5 to 18.5 percent, by controlling the amount of vehicle (pentane) used in the process. Accordingly, computer 67 produces and transmits a signal proportional to the determined concentration of polymer in the reaction system to a controller 60. The latter compares the computed concentration signal with a desired concentration introduced into controller 60 as a set point. If the signal from computer 67 is proportional to a polymer concentration outside the preferred concentration range, computer 67 sends signals proportional to the difference in concentration to one or both of flow rate controllers 37 and 52 to change the set points thereof. Accordingly, the flow rates of either or both of the pentane make-up in line 49 and pentane recycle in line 34 are changed to increase or decrease the amount of pentane vehicle in the reaction system, and thereby maintain the desired concentration of product in the reaction zone. An increase in the amount of pentane entering the reactor will cause an increase in pressure in the reactor 11, which pressure increase is sensed by pressure transmitter 23, causing pressure recorder controller 22 to open valve 21 further (or where reactor effluent is intermittently withdrawn, causing an increase in the frequency of effluent withdrawal). As such, the concentration of polymer in the reactor will decrease. On the other hand, a decrease in the amount of pentane entering the reactor will lower the reaction zone pressure and decrease the rate of effluent withdrawl, thereby increasing the concentration of polymer in the reaction zone. By thus maintaining the concentration of product in the reactor, the residence time of the reaction mixture in the reactor is controlled within the desired range, thereby assuring the optimum amount of product formed per pound of catalyst and the production of polymer product having a desirably low catalyst or ash content. Constant polymer concentration also enhances mechanical operation of the reactor by maintaining constant viscosity in the fluid slurry.

The computation of the concentration of polymer in the reaction mixture will now be described in detail. Applying Equation 1 to the polymerization process of FIGURE 1:

$C$ = concentration of polymer in reaction mixture (vol. %)
$d_m$ = density of reaction mixture comprising vehicle, olefin reactants, catalyst, and product
$d_{r+v}$ = density of liquid phase in reaction mixture
$d_p$ = density of polymer in reaction mixture As before, $d_p$ is a constant and $d_m$ is directly measured, while $d_{r+v}$ is indirectly measured or computed from compositional or analytical information furnished by gas chromatographic analysis of the off-gases resulting from flashing the reaction effluent to remove polymer therefrom.

The equations used to derive $d_{r+v}$ are as follows:

$$d_{r+v} = \frac{W}{V_1} \quad (2)$$

where $W$ = mass in grams of 1 cc. of gas sample at 760 mm. Hg and 140° F.
$V_1$ = equivalent liquid volume of sample at reaction conditions.

By means of chromatographic analysis of the off-gases, the amounts of ethylene and 1-butene are determined directly. The pentane in the sample is found by difference and the amount of 1-butene is multiplied by a constant, e.g., 1.25, to find the total amount of $C_4$'s. Thus, the weight, W, is found from the following equations:

$$W = C_2 + 1.25C_4 + C_5 \quad (3)$$

and $$V_G = \frac{C_2}{g_2} + \frac{1.25C_4}{g_4} + \frac{C_5}{g_5} \quad (4)$$

Equations 3 and 4 can be combined thus:

$$W = V_G g_5 + C_2\left(1 - \frac{g_5}{g_2}\right) + 1.25C_4\left(1 - \frac{g_5}{g_4}\right) \quad (5)$$

where $V_G$ = volume of chromatographic gas sample (1 cc. at 760 mm. Hg and 140° F.)
$C_2$ = mass of ethylene in sample (gms.)
$C_4$ = mass of 1-butene in sample (gms.)
$C_5$ = mass of pentane in sample (gms.)
$g_2$ = density of ethylene at 760 mm. Hg and 140° F.
$g_4$ = density of 1-butene at 760 mm. Hg and 140° F.
$g_5$ = density of pentane at 760 mm. Hg and 140° F.

$V_1$, the volume of equivalent liquid at process conditions $T_p$ and $P_p$, can be found from the equation:

$$V_1 = \frac{C_2}{d_2[1 - \alpha_2(T_o - T_p)]} + \frac{1.25C_4}{d_4[1 - \alpha_4(T_o - T_p)]} + \frac{C_5}{d_5[1 - \alpha_5(T_o - T_p)]} \quad (6)$$

where $d_2$ = liquid density of ethylene at $T_o$ and $P_p$
$d_4$ = liquid density of 1-butene at $T_o$ and $P_p$
$d_5$ = liquid density of pentane at $T_o$ and $P_p$
$\alpha_2$ = temperature coefficient of density of ethylene
$\alpha_4$ = temperature coefficient of density of 1-butene
$\alpha_5$ = temperature coefficient of density of pentane
$T_o$ = reference temperature (200° F.)
$T_p$ = temperature of reaction zone (° F.)
$P_p$ = pressure of reaction zone (p.s.i.a.)

Solving Equations 3 and 4 for $C_5$ and substituting it in Equation 6 we find:

$$V_1 = \frac{C_2}{d_2[1-\alpha_2(T_o-T_p)]} + \frac{1.25C_4}{d_4[1-\alpha_4(T_o-T_p)]} + \frac{V_G g_5 - C_2\left(\frac{g_5}{g_2}\right) - 1.25C_4\left(\frac{g_5}{g_4}\right)}{d_5[1-\alpha_5(T_o-T_p)]} \quad (7)$$

Simplifying Equation 7 we find:

$$V_1 = C_2\left[\frac{1}{d_2[1-\alpha_2(T_o-T_p)]} - \frac{\frac{g_5}{g_2}}{d_5[1-\alpha_5(T_o-T_p)]}\right] + 1.25C_4\left[\frac{1}{d_4[1-\alpha_4(T_o-T_p)]} - \frac{\frac{g_5}{g_4}}{d_5[1-\alpha_5(T_o-T_p)]}\right] + \frac{V_G g_5}{d_5[1-\alpha_5(T_o-T_p)]} \quad (8)$$

Equations 5 and 8 can be simplified by substituting K's for the various constants, and when the resulting simplified equations are substituted in Equation 2, we find:

$$d_{r+v} = \frac{K_1 + K_2 C_2 + K_3 C_4}{K_4 + K_5 C_2 + K_6 C_4} \quad (9)$$

where $K_4$, $K_5$, and $K_6$ are a function of $T_p$, $K_1 = V_G g_5$
$K_2 = 1 - g_5/g_2$
$K_3 = 1.25(1 - g_5/g_4)$
$K_4 = V_G g_5/d_5[1-\alpha_5(T_o-T_p)]$
$K_5 = 1/d_2[1-\alpha_2(T_o-T_p)] - g_5/g_2/d_5[1-\alpha_5(T_o-T_p)]$
$K_6 = 1.25/d_4[1-\alpha_4(T_o-T_p)]$
$\qquad - 1.25(g_5/g_4)/d_5[1-\alpha_5(T_o-T_p)]$ FIGURE 2 illustrates one way in which Equation 9 can be computed in computer 67 from input signals $C_2$ and $C_4$ of the analyzer 68, which signals are proportional to ethylene and 1-butene concentrations, respectively. This arrangement and order or circuitry and components is believed fairly self-explanatory and will be described only briefly in the interest of brevity.

In FIGURE 2, a reference potential from source 101 is applied across a potentiometer 102, the contactor 103 of which is positioned to carry a potential proportional to constant $K_1$, the latter being applied to adder 104. The input signal $C_2$, proportional to the ethylene content in the reaction mixture, is applied across potentiometer 106, the contactor 107 of which is positioned so as to multiply $C_2$ by constant $K_2$, the resulting potential proportional to $K_2 C_2$ being applied to adder 104. Similarly, the input signal $C_4$, proportional to the 1-butene content in the reaction mixture, is applied across potentiometer 108, the contactor 109 of which is positioned so as to multiply $C_4$ by constant $K_3$, the resulting potential proportional to $K_3 C_4$ also being applied to adder 104. Adder 104 adds or sums potentials $K_1$, $K_2 C_2$ and $K_3 C_4$ and produces an output potential proportional to W.

To determine $V_1$, a potential from source 101 is applied to potentiometer 111, the contactor 112 of which is positioned to pick off a potential proportional to $K_4$, the latter being applied to adder 113. The $C_2$ input is also applied to potentiometer 114, the contactor 116 of which is positioned to multiply $C_2$ by a constant $K_5$, the resulting potential proportional to $K_5 C_2$ being applied to adder 113. Similarly, input $C_4$ is applied across potentiometer 117, the contactor 118 of which is positioned to multiply $C_4$ by a constant $K_6$, the resulting potential proportional to $K_6 C_4$ also being applied to adder 113. Adder 113 adds or sums potentials $K_4$, $K_5 C_2$ and $K_6 C_4$ and produces an output potential proportional to $V_1$.

Potentials W and $V_1$ are applied to divider 119 where the former is divided by the latter to produce an output signal 121 proportional to $d_{r+v}$.

The output signal $d_{r+v}$ from the assembly shown in FIGURE 2 can be combined with the other values of Equation 1 using the arrangement of circuitry and components shown in FIGURE 3. Input $d_m$ proportional to the density of the reaction mixture, as measured and transmitted by density meter 66, and input $d_p$, a constant proportional to the density of the polymer under consideration, are combined in computer 67 with input $d_{r+v}$, according to Equation 1, and the output signal C is produced from the computer. Looking at FIGURE 3 briefly, adder 122 sums signals $d_m$ and $d_{r+v}$, and adder 123 sums signals $d_p$ and $d_{r+v}$. The output from adder 122 proportional to $d_m - d_{r+v}$ and the output from adder 123 proportional to $d_p - d_{r+v}$ are then transmitted to divider 124 where the former is divided by the latter and an output signal 126 proportional to the quotient, C, is produced proportional to the concentration of polymer in the reaction mixture. Divider 124 can be scaled so that the quotient of Equation 1 is multiplied by one hundred, to get said concentration in terms of percent.

In the case of a reaction mixture comprising a reactant A, a vehicle B (which can also serve as a reactant), and product, the values for W and $V_1$ in Equation 2 can be computed from the equations:

$$W = V_G g_B + A\left(1 - \frac{g_B}{g_A}\right) \quad (10)$$

$$V = \frac{A}{d_A[1-\alpha_{T_a}(T_o-T_p)]} + \frac{V_G g_B - A\left(\frac{g_B}{g_A}\right)}{d_B[1-\alpha_{T_b}(T_o-T_p)]} \quad (11)$$

where $V_G$ = volume of gas sample at standard conditions
$g_A$ = density of reactant A at standard conditions
$g_B$ = density of vehicle B at standard conditions
$A$ = mass of reactant A in sample
$d_A$ = liquid density of reactant A in liquid phase at $T_o$ and $P_o$
$d_B$ = liquid density of vehicle B in liquid phase at $T_o$ and $P_o$
$\alpha_{T_a}$ = temperature coefficient of density of reactant A
$\alpha_{T_b}$ = temperature coefficient of density of vehicle B
$T_o$ = reference temperature, °F.
$T_p$ = reaction zone temperature, °F Substituting K's for the constants in Equations 10 and 11 and substituting the resulting simplified equations in Equation 2, we get $$d_{r+v} = \frac{K_7 + K_8 A}{K_9 + K_{10} A} \quad (12)$$

where $K_7 = V_G g_B$
$K_8 = 1 - g_B/g_A$
$K_9 = V_G g_B/d_B[1-\alpha_{T_b}(T_o-T_p)]$
$K_{10} = 1/d_A[1-\alpha_{T_a}(T_o-T_p)]$
$\qquad - g_B/g_A/d_B[1-\alpha_{T_b}(T_o-T_p)]$ FIGURE 4 illustrates one way in which Equation 12 can be computed in computer 67 from input signal A of analyzer 68 proportional to the concentration of reactant A in the reaction mixture. In FIGURE 4, a reference potential is supplied from source 131 across potentiometer 132, the contactor 133 of which is positioned so as to apply a constant $K_7$ to adder 134. Input A, proportional to the concentration of reactant A in the reaction mixture, is applied across potentiometer 136, the contactor 137 of which is positioned so as to multiply input A by a constant $K_8$, the resulting potential proportional to $K_8 A$ also being applied to adder 134. In adder 134, potentials $K_7$ and $K_8 A$ are summed and a potential proportional to W is produced. A potential from source 131 is applied to potentiometer 138 the contactor 139 of which is positioned to pick off a potential proportional to $K_9$, which is transmitted to adder 141. Input A is also transmitted to potentiometer 142, the contactor 143 of which is set to multiply A by $K_{10}$. The product $K_{10}A$ is transmitted to adder 141 where $K_9$ and $K_{10}A$ are summed to produce a potential proportional to $V_1$. Signals proportional to W and $V_1$ and then supplied to divider 144 where the former is divided by the latter to produce a signal 146 proportional to $d_{r+v}$.

The output $d_{r+v}$ from the circuitry of FIGURE 4 can be combined with the other values of Equation 1 in the manner described in FIGURE 3 to compute the concentration of product in a reaction mixture comprising a reactant A, a vehicle B, and a product, the resulting signal C once again being transmitted by computer 67.

In a similar fashion, the concentration of product in a reaction mixture comprising three or more reactants, a vehicle (which can also serve as a reactant), and product, can be computed and a signal proportional thereto used to control the concentration of product in the reaction mixture. Such systems will not be described in the interest of brevity since they will be obvious to one skilled in the art in view of the foregoing description.

As mentioned above, it is also within the scope of our invention to compute the concentration of reactants in the reaction zone and accordingly control the amounts of reactants in the reaction zone. This is accomplished by analyzing the reaction mixture or the reactor effluent from which product has been separated and accordingly controlling the flow rates of one or more of the reactant feed streams to maintain the concentration of the reactant(s) in the reaction zone or a preferred ratio of two or more reactants in the reaction zone.

Referring once again to FIGURE 1, analyzer 68 can produce an output signal proportional to the ethylene concentration in the reaction mixture and this signal can be transmitted to a controller 65. The latter compares the computed ethylene concentration signal with a desired ethylene concentration signal introduced into controller 65 as a set point. Controller 65 produces a signal proportional to the difference between computed and desired ethylene concentrations, this signal being used to manipulate the set point of flow rate controller 43 in the ethylene feed stream 41. Output signals from analyzer 68 proportional to the 1-butene and ethylene concentrations in the reaction mixture can also be transmitted to divider 70 where the former is divided by the latter to produce an output signal proportional to the quotient, $C_4/C_2$, which signal is transmitted to controller 75. The latter compares the computed $C_4/C_2$ ratio with a desired $C_4/C_2$ ratio introduced into controller 75 as a set point. Controller 75 produces a signal proportional to the difference between the computed and desired $C_4/C_2$ ratios, this signal being used to manipulate the flow rate controller 47 in the 1-butene feed stream 45 so as to manipulate the set point thereof and ensure a predetermined $C_4/C_2$ ratio in the reaction zone. By thus controlling the flow rates of the olefin reactants, the desired quality or specification of polymer product can be controlled and maintained.

The various components, such as controllers, adders, dividers, flow rate controllers, pressure transmitters, etc., are well known in the art and, therefore, details of their construction have not been described or shown here. For example, adders 104, 113, 122, 123, 134, and 141 may consist of the Foxboro Model 56 Computing Relay, described in Catalog 37-A-57a, September 12, 1956, of the Foxboro Company, or Type 66 CR-2H, described in Bulletin 1-35 of said Foxboro Company. Dividers 119, 124, and 144 can consist of Type 66 DR-2H2 described in said Bulletin 1-35 of the Foxboro Company. Taylor Transaire Pressure Transmitter No. 317RN, described in Taylor Instrument Company Brochure 2B100 of December, 1952, may be employed for pressure transmitters 38, 44, 48, and 53. Foxboro Model M/40 Controller, described in Bulletin 5A-10A, November, 1955 of the Foxboro Company, may be used for controllers 37, 43, 47, and 52, and controllers 60, 65, 75.

*Example*

A specific example will now be described wherein a process like that illustrated in FIGURE 1 is carried out and the concentration of polymer in the reaction mixture is computed and the process controlled accordingly in a manner provided by the subject invention. In this polymerization process, under steady state operation, an olefin feed stream consisting of 14,800 lbs./SD of ethylene and 1,000 lbs./SD of 1-butene, and having a pressure of 500 p.s.i.g., is fed to a loop reactor together with 7 lbs./SD of a chromium oxide-silica alumina catalyst, the catalyst having a productivity of 2,100 lbs. of polymer per lb. of catalyst. A vehicle consisting of n-pentane is fed to the reactor at a rate of 16,400 lbs./SD. The reactor itself has a capacity of 2,650 gallons. The reaction temperature is maintained below 230° F. and in the range of 150-225° F. by circulating water as a coolant in an external jacket, the water being introduced into the jacket at 177° F. and removed at 184° F. The hydraulic pressure in the rector is 475 p.s.i.a. and the vapor pressure is 265 p.s.i.a. The residence time of the reaction mixture in the reactor is 3 hours and the concentration of polymer under steady state operation in the reactor is 12 vol. percent. Polymer is withdrawn at the rate of 13,045 lbs./SD along with 16,400 lbs./SD of n-pentane, 1,890 lbs./SD of ethylene, 865 lbs./SD of 1-butene, and 7 lbs./SD of catalyst. The conversion efficiency of the ethylene is 87% and the conversion efficiency of 1-butene is 13.5%.

Due to a process upset, such as an increased pentane flow rate, the concentration of polymer in the reactor falls. This decrease in polymer concentration is detected, measured, and corrected according to our invention as follows.

The density of the reaction mixture is measured as well as the concentration of ethylene and 1-butene in the flashed reaction effluent or off-gas. It is found that the density of the reaction mixture is 0.537. In the reactant and vehicle phase the concentration of ethylene is 5.5 wt. percent, the concentration of 1-butene is 5.0 wt. percent, the concentration of total $C_4$'s is 6.5 wt. percent, and the concentration of n-pentane is 88%. The density of the combined reactant and vehicle is 0.505. The density of the polymer at reactor conditions is 0.900. These values are computed according to Equation 1 and it is found that the concentration of polymer within the reaction zone is only 8 vol. percent. Accordingly, the amount of n-pentane introduced into the reactor is decreased to 14,760 lbs./SD; this results in the removal of polymer from the reaction zone at a decreased rate of 11,610 lbs./SD. As a result of this operation, the concentration of polymer in the reaction zone returns to the preferred concentration of 12 vol. percent.

At another point during the reaction, the density of the reaction mixture is found to be 0.57, and the concentration of polymer found to be 16.5 vol. percent. Accordingly, the rate of flow of pentane to the reactor is increased to 17,056 lbs./SD, resulting in an increase in polymer withdrawal to 13,426 lbs./SD. Thereafter, the concentration of polymer in the reaction zone decreases to the preferred value of 12 vol. percent.

Under steady state operation, the preferred concentration of ethylene is 5 weight percent, and the weight ratio of 1-butene to ethylene is 1.0. At a certain period in operation, the chromatographic analysis of the flashed reactor effluent establishes that the ethylene concentration is 4 weight percent. Accordingly, controller 65 compares a signal proportional to said 4 weight percent with set point 5 weight percent of said controller 65, and accordingly flow rate controller 43 is readjusted to increase the supply of ethylene to 16,300 lbs./SD. At another period in operation, the chromatographic analysis of the flashed reactor effluent also establishes that the 1-butene concentration is 4 weight percent, and the ethylene concentration is 5 weight percent. Signals proportional thereto are divided in divider 70, and it is found that the weight ratio of 1-butene/ethylene is 0.8. A signal proportional thereto is transmitted to controller 75 and compared therewith with a set point of 1, the preferred weight ratio. Accordingly flow rate controller 47 is adjusted to increase the flow rate of 1-butene to 1200 lbs./SD, the time constant of the 1-butene control system having been adjusted to be longer than the ethylene control system time constant. These corrections of the ethylene and 1-butene flow rates, ensure the continuous production of a polymer product having a desired density, e.g., 0.940.

Various modifications and alterations of this invention will become apparent to those skilled in the art, without departing from the scope and spirit of this invention, and it should be understood that the subject invention is not to be limited unduly to that set forth herein for illustrative purposes.

We claim:

1. In a process for the polymerization of 1-olefin reactant in the liquid phase in a reaction zone in the presense of a liquid hydrocarbon vehicle, wherein a polymer product is formed the density of which is different than the density of the non-product phase of the resulting reaction mixture, and the flow rate of said vehicle passed to said zone is manipulated in response to the computed concentration of said product in said reaction mixture to maintain a predetermined concentration of said product in said reaction mixture, the improvement comprising measuring the density, $d_m$, of said reaction mixture and producing a signal proportional thereto, analyzing said reaction mixture to determine the concentrations of said reactant and said vehicle and producing signals proportional to said concentrations, combining the latter signals to determine the density $d_{r+v}$ of the combined reactant and vehicle in said reaction mixture and producing a signal proportional thereto, producing a signal proportional to the density $d_p$ of said product, combining said signals according to the equation:

$$C = \frac{d_m - d_{r+v}}{d_p - d_{r+v}} \times 100$$

to determine the concentration, C, of said product in said reaction mixture and producing a signal proportional thereto, and controlling the flow rate of said vehicle to said reaction zone in response to the latter signal to maintain a predetermined concentration of said product in said reaction mixture.

2. In the process according to claim 1, wherein the flow rate of said reactant to said reaction zone is controlled in response to said signal proportional to said concentration of said reactant to maintain a predetermined concentration of reactant in said reaction zone.

3. In a process according to claim 1, wherein said 1-olefin reactant comprises at least one aliphatic 1-olefin having from 2 to 8 carbon atoms per molecule and no branching nearer the double bond than the 4-position.

4. In a process according to claim 1, wherein said 1-olefin reactant is ethylene.

5. In a process according to claim 1 wherein said olefin reactant comprises ethylene and 1-butene, said vehicle comprises n-pentane, and wherein the flow rate of said ethylene is controlled in response to said signal proportional to said determined concentration thereof in said reaction zone, the flow rate of said 1-butene to said reaction zone is controlled in response to the ratio of said signals proportional to said determined concentrations of ethylene and 1-butene in said reaction mixture, and the flow rate of said n-pentane is controlled in response to said signal proportional to said determined concentration of ethylene-1-butene copolymer product in said reaction mixture.

6. A method for determining the concentration of a polymer product in a reaction mixture comprising said product, a liquid hydrocarbon vehicle, and 1-olefin reactant, wherein the density of said product is different than the density of the non-product liquid phase of said reaction mixture, comprising measuring the density $d_m$, of said reaction mixture and producing a signal proportional thereto, analyzing said reaction mixture to determine the concentrations of said reactant and said vehicle and producing signals proportional to said concentrations, combining the latter signals to determine the density $d_{r+v}$ of the combined reactant and vehicle in said reaction mixture and producing a signal proportional thereto, producing a signal proportional to the density $d_p$ of said product, combining said signals according to the equation:

$$C = \frac{d_m - d_{r+v}}{d_p - d_{r+v}} \times 100$$

to determine the concentration, C, of said product in said reaction mixture and producing a signal proportional thereto.

References Cited by the Examiner

UNITED STATES PATENTS

| | | | |
|---|---|---|---|
| 2,908,734 | 10/1959 | Cottle | 260—94.9 |
| 2,974,017 | 3/1961 | Morgan | 260—94.9 |
| 3,108,094 | 10/1963 | Morgan | 260—94.9 |

JOSEPH L. SCHOFER, *Primary Examiner.*

MORRIS LIEBMAN, *Examiner.*